US005579219A

United States Patent [19]
Mori et al.

[11] Patent Number: 5,579,219
[45] Date of Patent: Nov. 26, 1996

[54] MULTI-PROCESSOR SYSTEM AND METHOD OF PROCESSING DATA THEREBY

[75] Inventors: Kinji Mori, Machida; Shigeki Hirasawa, Kawasaki, both of Japan

[73] Assignee: Hitachi, Ltd., Tokyo, Japan

[21] Appl. No.: 213,824

[22] Filed: Mar. 14, 1994

Related U.S. Application Data

[63] Continuation of Ser. No. 705,533, May 24, 1991, abandoned.

[30] Foreign Application Priority Data

May 25, 1990 [JP] Japan .................................. 2-133825

[51] Int. Cl.6 .............................. G06F 7/70; G05B 15/00
[52] U.S. Cl. ................ 364/133; 364/431.12; 364/426.01
[58] Field of Search .................................... 364/131, 133, 364/431.03, 431.12, 551.01, 426.01; 340/825.06, 825.4; 395/725; 123/416, 417, 480

[56] References Cited

U.S. PATENT DOCUMENTS

| | | | |
|---|---|---|---|
| 4,532,593 | 7/1985 | Mouri et al. | 364/431.11 |
| 4,562,545 | 12/1985 | Hasegawa | 364/431.12 |
| 4,884,204 | 11/1989 | Seibt et al. | 364/133 |
| 4,945,486 | 7/1990 | Nitschke et al. | 364/133 |
| 5,001,642 | 3/1991 | Botzenhardt et al. | 364/431.12 |

Primary Examiner—Paul P. Gordon
Attorney, Agent, or Firm—Antonelli, Terry, Stout & Kraus

[57] ABSTRACT

A method of data processing in a multi-processor system having multiple processors mutually connected via a transmission path in a moving object or in multiple moving objects, in which each processor only takes in data that the particular processor needs from a transmission path by the processor's own determination without an instruction from another processor and processes that data.

11 Claims, 4 Drawing Sheets

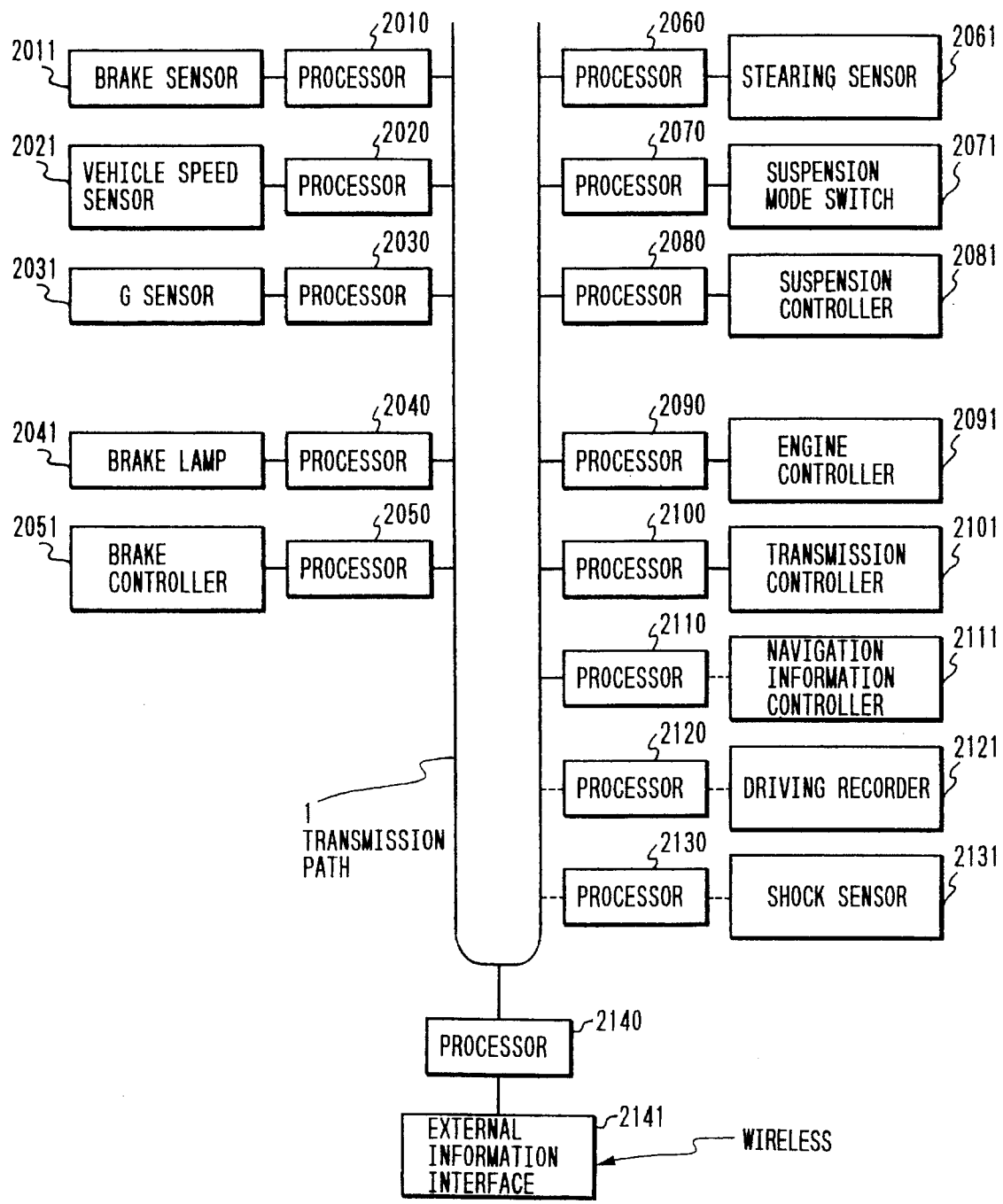

MULTI-PROCESSOR SYSTEM AND METHOD OF PROCESSING DATA THEREBY

This application is a application of Ser. No. 07/705,533, filed May 24, 1991, now abandoned.

BACKGROUND OF THE INVENTION

Field of the Invention

This invention pertains to a multi-processor system having multiple processors arranged in a moving object or in multiple moving objects and the method of processing data in said multi-processor system.

Recently, electronics applications in moving objects such as automobiles have increased in order to achieve greater ease of operation, operational stability, safety and comfort. As more sophisticated control is attempted, however, the number of sensors, controllers and actuators mounted on the moving object increases and the size of the wire harness connecting them also increases accordingly. This increase in harness size not only increases the weight of the moving object but also increases the difficulty of installing wires and causes many problems such as response delay between the sensor and actuator and reduced reliability. In recent years, networking in a moving object has been tried in order to reduce the harness size. But a moving object such as an automobile comes in a variety of model types and therefore modifications occur frequently. Because they are exported to many countries all over the world, the moving objects must be modified to suit the regulations and weather conditions of various countries. For a moving object, safety is the first concern, and ease of operation and comfort are also important product features.

Therefore, for reasons of safety, high reliability and fault tolerance (capacity to continue operating correctly when a fault occurs) are demanded of the network multi-processor system; expandability, that is, ease of adding and removing a processor (controller) is demanded to accommodate various model types, modifications for exports and improvement in quality. Additionally, in order to attain good serviceability, the parts must be easily replaceable by removal and insertion when a fault occurs.

In a conventional multi-processor system in a moving object, each processor in the system specifies the address of the receiver when transmitting data. Thus, if the structure of overall system is not yet determined if the structure changes due to an addition removal of problem within a processor, the address needs to be redefined or a problem in part of the system often stops the overall system operation. Conventionally, realization of a network multi-processor system to increase reliability requires special hardware and software and if a problem occurs, a procedure to activate a backup system is necessary, thereby bringing about many problems in terms of cost and response.

The conventional data flow type program does not run unless all input data are present. In the conventional multi-processor system in a moving object, each processor in the system specifies the address of the receiver when transmitting data.

Thus, the relationship between the transmitting and receiving processors must be predetermined, so that the relationship between individual processors becomes closer. For this reason, when the system configuration is undefined or changed, the relationship between the transmitting and receiving processors must be redefined, which affects the overall system. When a multiplicated system is implemented, special hardware and software are required and this is an unacceptable problem in terms of cost. When the control software is data-flow-type, the software is not actuated until all input data are received, and when data is missing for any reason, important software is not driven.

SUMMARY OF THE INVENTION

The purpose of this invention is to provide a processor system and data processing method which solves the above problem, raises the system's resistance to faults and facilitates expansion, reduction and maintenance of the system by weakening the relationships between the processors constituting the system on the premise that the system configuration is still undefined or changes frequently.

This invent ion is characterized by the fact that, in order to achieve the objective mentioned above, when each processor between moving objects or in the moving object system communicates, the transmitter does not set any receiving address but, instead, transmits a code indicating the content of the data, and that the receiver decides whether or not the data should be received according to the content code and only takes in data that it needs.

In addition, this invention is characterized in that, in case of starting a program with received multiple data as input data, when one or multiple preset data are prepared as input data, the program is run to process the input data regardless of whether or not there is other input data.

According to this invention, each processor does not have to recognize the address of other processors in the system but rather must only memorize the content code to be received. Because each processor takes in the data from the data transmission path by its own judgment according to the content code, the relationship between individual processors becomes very weak.

When each processor takes in data, it actuates a program with the data as input data, processes the input data, and broadcasts its output data to the transmission path with a content code indicating the data content. At this time, even if all input data are not prepared, the program can be started with only important input data. The relationship between the transmitting and receiving processors is not predetermined, so a processor can be added to or removed from the system.

Multiple processors can receive the data with the same content code because the data is always broadcast. Thus, multiple systems can be implemented easily, and if any one of the multiple systems fails, the functionality of the entire system can be maintained.

BRIEF DESCRIPTION OF THE DRAWINGS

FIGS. 4 and 5 are detailed drawings of the embodiment according to FIG. 2.

DETAILED DESCRIPTION OF THE PREFERRED EMBODIMENT

Figure 2:
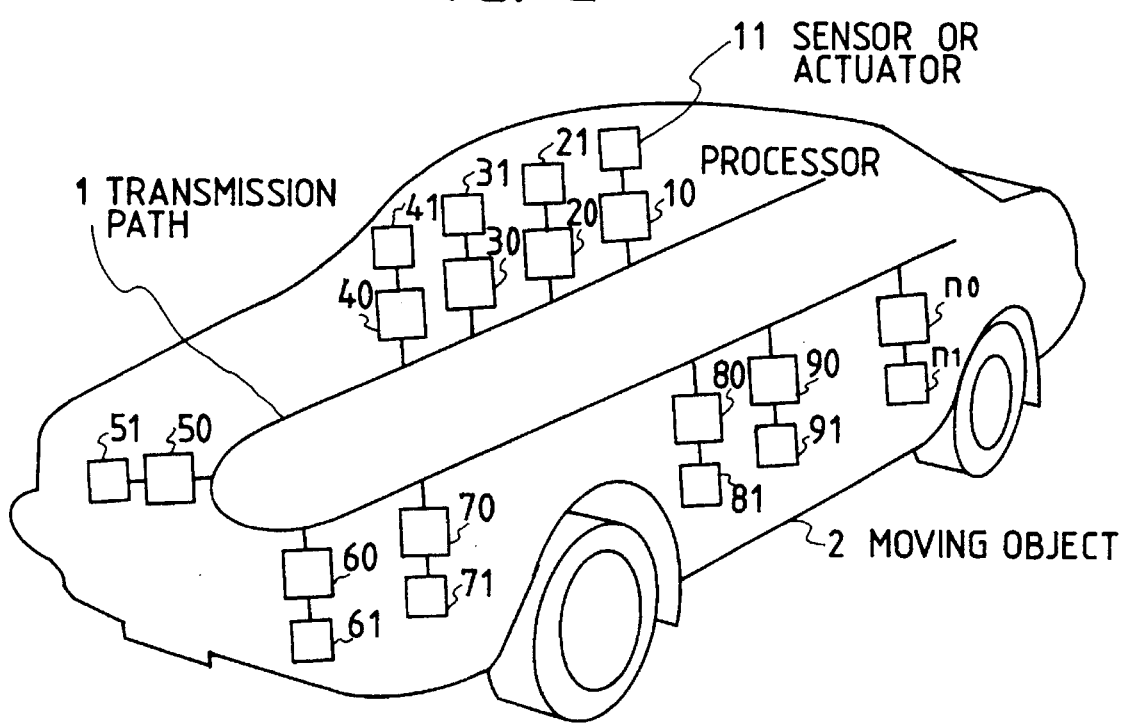
FIG. 2 shows the configuration of the multi-processor system in a moving object, based on the present invention.

FIG. 2 indicates the configuration of the entire multi-processor system to which this invention is applied. The moving object (such as a vehicle, train, airplane, or ship)

contains transmission path 1, processors 10 to n0, and sensors or actuators 11 to n1. Processors 10 to n0 transmit and receive messages to and from each other via transmission path 1. Each processor contains an arithmetic processing unit and memory unit storing data and programs, and is connected to sensors or actuators 11 to n1. Processors 10 to n0 may be integrated with sensors or actuators 11 to n1.

Figure 1:
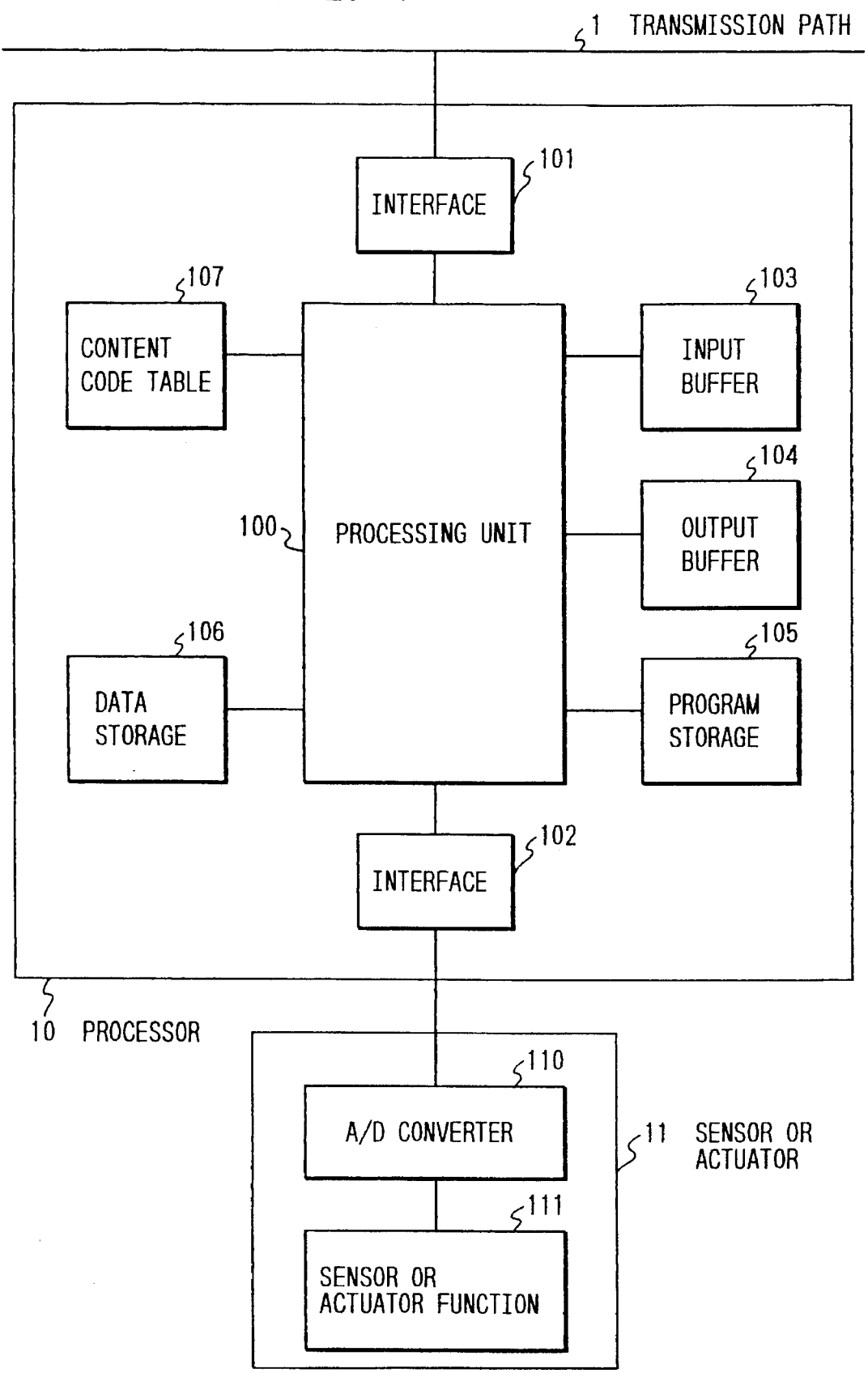
FIG. 1 shows the configuration of the processor, sensor and actuator for the present invention.

FIG. 1 shows an example of processor 10 and sensor or actuator 11. Processing unit 100 is connected to transmission path 1 via interface 101, and is connected to sensor or actuator 11 via interface 102. Processing unit 100 is connected to input buffer 103, output buffer 104, program storage memory 105, data storage memory 106, and content code table 107. Content codes indicating the content of the data which can be processed are registered in this table. Sensor or actuator 11 consists of A/D converter 110 and sensor or actuator 111. A/D converter 110 is connected to interface 102 and sensor or actuator 111. Sensor or actuator 111 contains a signal adjusting unit such as a signal amplifier.

Figure 3:
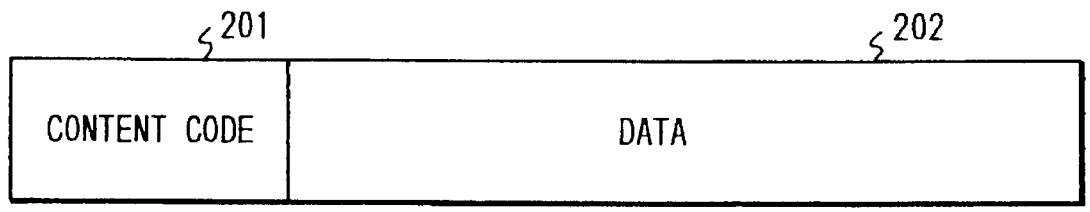
FIG. 3 shows the message format of the data with the content code.

Suppose that the processing unit 100 receives a signal from sensor 11 via interface 102. At this time, a program stored in program storage memory 105 starts and processes signals from the sensor. As shown in FIG. 3, an output message, having a message format consisting of a content code indicating information from that sensor and data 202 representing the information from the sensor, is transferred to output buffer 104. From there the output message is sent out to transmission path 1 via interface 101 according to a specified message transmission timing.

When the message flows in transmission path 1, each processor takes it into its input buffer via interface 101. Processing unit 100 of each processor inspects the content code 201 of the message by comparing it with content code table 107. If there is a coincidence, input buffer 103 transmits the message to data storage memory 106, where data are stored corresponding to each content code. If there is no coincidence, input buffer 103 is cleared.

When data is stored in data storage memory 106 as the starting condition of that program, a program stored in program storage memory 105 is started immediately with those data as input data. The started program processes input data, attaches an output content code to the output data when terminating the processing, transfers output messages to output buffer 104 according to the message format shown in FIG. 3, and sends the output messages out from output buffer 104 to transmission path 1 via interface 101 according to a specified message transmission timing. At the same time, signals are sent to actuator 11 via interface 102 according to the result of processing. These signals control the actuator. Of course, another processor n0 can control actuator n1 according to a message sent out on the transmission path.

Because individual processors take in data from transmission path 1 where data flows according to the data content code rather than processor address recognition, the relationship between individual processors becomes very weak. Each processor does not have to be conscious of the existence of other processors.

In automobiles, the application of electronics has been advanced in braking system to improve the safety. In particular, the braking system requires high reliability from multiple processors because the brakes may fail when the braking system malfunctions so as to threaten lives.

Figure 4:
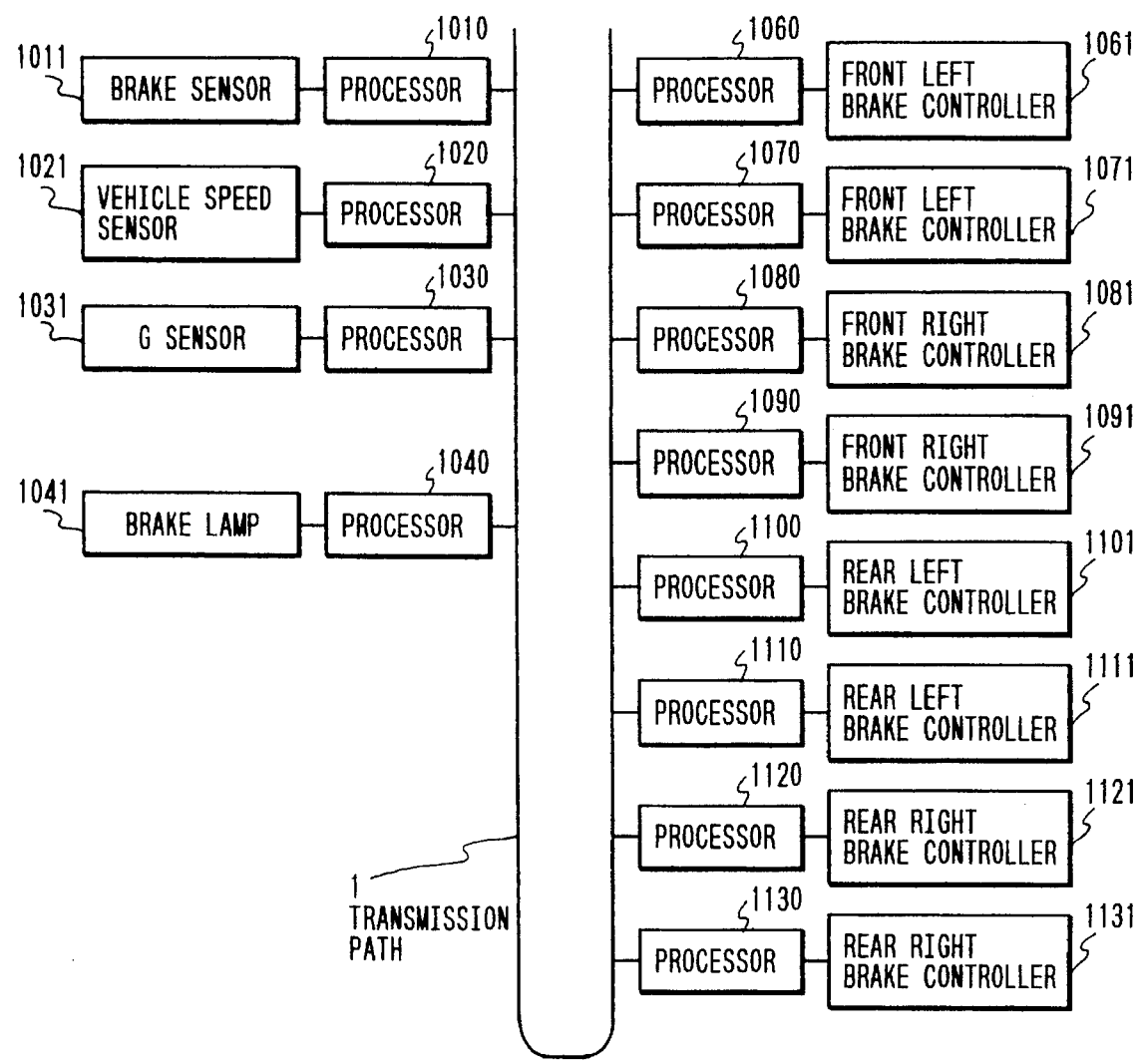

FIG. 4 is an application of the system mounted on moving object 2 shown in FIG. 2. Processors 1010 to 1130 are connected to each other via transmission path 1; they transmit and receive messages according to a protocol based on the content code. Each processor contains an arithmetic processing unit and memory storing data and programs, and is connected to sensors or actuators 1011 to 1131. In this application, brake sensor 1011, speed sensor 1021 and G sensor 1031 sense information, vehicle speed and acceleration from the brake pedal. Front left brake control units 1061 and 1071, front right brake units 1081 and 1091, rear left brake control units 1101 and 1111, and rear right brake control units 1121 and 1131 act as actuators and control the motions of the four wheels by applying double control to a single wheel. In addition, the brake lamp 1041 is provided as the actuator. In the double control system processor, the same application program is set in each program storage memory 105. For example, a program for front left brake control (including advanced braking control such as antiskip brake, etc.) is set in processors 1060 and 1070.

Processor 1010 processes information from brake sensor 1011 periodically and when processor 1010 determines that the brake is pressed, it sends out a message according to the format shown in FIG. 3 with a content code indicating that the data concerns braking conditions (brake pressing force and amount, etc.). Processor 1020 processes the information from the speed sensor 1021 periodically and sends out a message according to the format shown in FIG. 3 with a content code indicating that the data concerns vehicle speed. Similarly processor 1030 processes information from the G sensor periodically and sends out a message according to the format shown in FIG. 3 with a content code indicating that the data concerns acceleration.

When a message flows on transmission path 1, each processor inspects the content code of its message by the transmitted content code with the possessed content code table 107. If there is a coincidence, it stores the data in the data storage memory location assigned to each content code; if there is no coincidence, it takes in no data. The content code indicating a brake condition is registered in processor 1040, and the content codes indicating brake condition, speed and acceleration are registered in the content code table 107.

Suppose that the brake is pressed. Processor 1010 sends out brake state data together with the content code according to the transmission protocol. Processor 1040 takes in the message from transmission path 1, inspects the content code and stores that data in data storage memory 106. When brake state data is stored in the storage memory 106, a program stored in the program storage memory 105 is started immediately by using that data as input data. The started program processes input data and controls the brake lamp acting as the actuator. Processors 1060 to 1130 take in the message from transmission path 1 independently, inspect the content code and store data in data storage memory 106. When brake state data is stored in data storage memory 106, a program stored in program storage memory 105 is started immediately by using brake state data, speed data and acceleration data as input data. If no speed data or acceleration data is obtained because of a fault, etc., a predetermined initial value is given as input data. Because speed data and acceleration data are always flowing periodically at this point, updated data is stored in the data storage memory 106. In this way, even if data (other than high priority data) is not present, the program is nonetheless started. The started program processes input data and gives instructions about the control of each wheel to the brake control units acting as actuators while estimating the vehicle condition from the speed and acceleration (vehicle back/forth, right/left, vertical motions and rotational motions such as rolling, pitching and yawing). Although processors 1060 to 1130 operate the brake control unit independently, the program is data flow type and the load on the individual processors 1060 to 1130 is almost the same; therefore the brake control is done on the four wheels at the same time.

When control is done, the result of processing is sent out to transmission path 1 as output data. For example, processor 1061 sends out data according to the message format shown in FIG. 3, together with the content code indicating that it is front left brake control data.

Suppose that processor 1060 or front left brake control unit 1061 is in trouble. Because the system has another front left brake control unit, a brake failure does not occur. Because updated speed data and acceleration data are always given, processor 1070 controls the front left brake control unit 1071 so as to compensate for a brake control unit that is in trouble.

As mentioned above, this invention allows the realization of a multiplicated system and a fault tolerant capability depending on the importance of the control function easily without using special hardware and software. It does this by registering the same content code into and storing the same application program in the multiple processors to take in data from the transmission path 1 where data flows without knowing the address of each processor according to the content code indicating the content of data. Additionally, because each processor operates independently on its own judgment without being given any instruction from another processor, switching to a backup processor is not required when any processor in the multi-processor system has a problem, and that problem does not affect the other processors. Taking into account a loss at the time of switching operation, this system is capable of realizing greater levels of safety, comfort and steering stability.

Automobiles vary in type and model, and the function to be loaded differs depending on the type and model, thereof. Therefore, to correspond to various vehicle types, the processor itself and corresponding ease of adding and changing its software affect the cost greatly. The current trend is an increase in special specification vehicles produced in small quantities.

FIG. 5 shows another application of the system in the moving object shown in FIG. 2. Processors 2010 to 2140 are connected to each other via transmission path 1, and the transmission processors receive messages according to the protocol based on the content code mentioned above. Each processor contains an arithmetic processing unit and memory storing data and programs, and is connected to sensors or actuators 2011 to 2141. Brake sensor 2011, speed sensor 2021, G sensor 2031, brake lamp 2041 and brake controller 2051 are provided for the brake system; steering sensor 2061, suspension mode switch 2071 and suspension controller 2081 are provided for the suspension system; and engine controller 2091 and transmission controller 2101 are provided for the power system. Navigation information controller 2111, driving recorder 2121, shock sensor 2131, and outside information interface unit 2141 are provided as an additional system.

In some types of vehicles, a driver is able to obtain a desired suspension state on the basis of the information from suspension mode switch 2071. More sophisticated types of vehicles have a function to operate the suspensions of the inside and outside wheels when turning further on the basis of information from steering sensor 2061. Further sophisticated types of vehicles control the suspension so as to make the front wheels suspension rigid not only when turning but also when applying the brake, on the basis of information from steering sensor 2061 and brake sensor 2011. In these cases, the functionality increases simply by replacing processor 2080 controlling suspension controller 2081 together with its software. That is, as a first step, the software and hardware taking in and controlling suspension mode information flowing on the transmission path are loaded, and as the next step, software and hardware taking in and controlling suspension mode information and steering information are loaded. Finally software and hardware taking in and controlling suspension mode information, steering information and brake information are loaded. Of course, the above information is sent out according to a transmission protocol based on the said content code and each processor takes in only data required for itself. Similarly, when the data originally used in only the brake controller such as the information from brake sensor 3011 is desired to be utilized for other higher control, the information is supplied with a content code and is then transmitted; therefore it can be taken in for use easily. In the conventional system, the data sending side specifies a receiving side by address; therefore it is necessary to change the sending side, for example, the braking sensor 3011 and generally, the protocol between the sending and receiving processors needs to be redefined to change the system configuration.

As mentioned above, because data is transmitted together with its content code indicating the content to the transmission path and each processor selects data by its judgment depending on the situation, it is not necessary to determine the relationship between the sending and receiving processors. Therefore, when the system configuration is changed for each vehicle type or an additional processor is added or software is modified in the process of design and manufacturing, the overall system is not affected, and additions to removal from and other changes to the system are easy. In this case, the system configuration can be changed easily by replacing a processor containing software or an integrated unit with the processor and sensor or actuator as a single part.

In addition, it is necessary to detect an error of operation rapidly and accurately. The content codes of all the data flowing on the transmission path are registered in the processor 2120 controlling the driving recorder. This enables diagnosis of the input and output for all the controls concerned with brake control, suspension control and engine control, so that not only errors in each control but also errors in the overall moving object control by combination of individual controls can be diagnosed accurately. Processor 2120 always stores the data flowing on the transmission path recently in the driving recorder 2121. If an error is detected, it instructs the driving recorder 2121 to light the alarm lamp. When a larger shock than a certain level is received, shock sensor 2131 and the processor controlling it, 2130, send out the data notifying of the large shock together with a corresponding content code. The processor 2120 controlling the driving recorder 2121 in cooperation with shock sensor 2131 and processor 2130 permanently stores the data memorized by the driving recorder 2121 when such a shock data is received to be available for the survey of self condition.

Because each processor broadcasts output data onto the transmission path 1 as mentioned above, a processor requiring that particular data may take it in as required, and can monitor control data and easily utilize it for abnormality diagnosis and maintenance.

To provide higher information service, not only information from the inside network of a vehicle but also external information is required. The external information interface unit 2141 communicates data with the outside by radio. At this time, radio frequency and content codes are converted to secure an interface with the inside and outside of the vehicle. Suppose that the external information interface unit 2141 receives traffic information dispatched at a certain frequency from an intersection, for example, a road map of the area surrounding the intersection, possible traffic jams and corresponding road conditions. Then the processor 2140 sends out those pieces of information to the transmission path 1 as a message by attaching a content code depending on each piece of information. The sent message is taken in by the processor 2110 by its own judgment according to the content code and displayed on the navigation information controller 2111. On the other hand, when information sensed by the shock sensor 2131 is sent from the processor 2130 with a content code indicating this event, processor 2140 takes in that information by its judgment according to the content code and instructs the external information interface unit 2141 to send data at a certain frequency. The data of this frequency can be received by the external information interface unit 2141 of another moving object. At this time, the processor 2140 the other moving object converts the frequency of radio and content code, and sends the data out to the transmission path 1 as a message with a content code. The sent message is taken in and processed by a processor which requires it by its determination according to the content code. Consequently, a traffic accident which occurs near a moving object can be sensed quickly and a vehicle in the accident can be determined by stored vehicle numbers in the data. Although in the embodiment mentioned above, a program can be driven even if data other than one or multiple high priority data are not presented, this fact is not limited to this case but can be applied to processing in the system having only one processor.

In this invention, the relationship between the transmitting and receiving processors in a system is not predetermined because communication is based, rather, on a content code and data flow type by only important input data. Other processor can be added and removed to or from the system easily, and a multi-processor system can be realized easily without using a special hardware or software. With trouble in only a part of the system, the function of the entire system can be maintained so as to build up a highly trouble resistant system.

Many different embodiments of the present invention may be constructed without departing from the spirit and scope of the invention. It should be understood that the present invention is not limited to the specific embodiments described in this specification. To the contrary, the present invention is intended to cover various modifications and equivalent arrangements included within the spirit and scope of the claims.

What is claimed is:

1. A method of processing data in a multi-processor system by transmitting data between multiple processors interconnected via a transmission path, at least one of said multiple processors having an application program which utilizes a plurality of data for execution thereof, said method comprising the steps of:

registering, for later use in said at least one of said multiple processors, information related to said plurality of data utilized for execution of said application program;

receiving in said at least one of said multiple processors from said transmission path, data to be utilized by said application program based upon the registered information;

determining whether at least one datum of said plurality of data utilized for execution of said application program has been received in said receiving step, said at least one datum being a predetermined datum for starting execution of said application program; and starting execution of said application program when said predetermined datum has been received as indicated by a result of said determining step, regardless of whether or not all of said plurality of data utilized for execution of said application program has been received;

wherein in said starting step when there is at least an unreceived datum of said plurality of data utilized for execution of said application program, execution of said application program is started using an initial value preliminarily specified to correspond to said unreceived datum as said unreceived datum, and received data.

2. A method of processing data in a multi-processor system by transmitting data between multiple processors interconnected via a transmission path, at least one of said multiple processors having an application program which utilizes a plurality of data for execution thereof, said method comprising the steps of:

registering, for later use in said at least one of said multiple processors, information related to said plurality of data utilized for execution of said application program;

receiving, in said at least one of said multiple processors from said transmission path, data to be utilized by said application program based upon the registered information;

determining whether at least one datum of said plurality of data utilized for execution of said application program has been received in said receiving step, said at least one datum being a predetermined datum for starting execution of said application program; and starting execution of said application program when said predetermined datum has been, received as indicated by a result of said determining step, regardless of whether or not all of said plurality of data utilized for execution of said application program has been received;

wherein in said starting step when there is at least an unreceived datum of said plurality of data utilized for execution of said application program, execution of said application program is started using a previously and most recently updated value of said unreceived datum as said unreceived datum, and received data.

3. A method according to claim 2, wherein in said registering step, code data corresponding to contents of said plurality of data utilized for execution of said application program are registered.

4. A method according to claim 1, wherein in said registering step, code data corresponding to contents of said plurality of data utilized for execution of said application program are registered.

5. A method according to claim 4, further comprising the step of:

sending, by each of said multiple processors, processed result data to said transmission path with at least one of said code data corresponding to the content of said processed result data.

6. A multi-processor system for processing data by transmitting data between multiple processors interconnected via a transmission path, at least one of said multiple processors having an application program which utilizes a plurality of data for execution thereof, said at least one of said multiple processors comprising:

a storage for storing, for later use, information related to said plurality of data utilized for execution of said application program; and a processing unit for receiving, from said transmission path, data to be utilized by said application program based upon said information stored in said storage, determining whether at least one datum of said plurality of data utilized for execution of said application program has been received, said at least one datum being a predetermined datum for starting execution of said application program, and starting execution of said application program when said predetermined datum has been received regardless of whether or not all of said plurality of data utilized for execution of said application program has been received;

wherein said processing unit, when there is at least an unreceived datum of said plurality of data utilized for execution of said application program, starts execution of said application program using an initial value preliminarily specified to correspond to said unreceived datum as said unreceived datum, and received data.

7. A multi-processing system for processing data by transmitting data between multiple processors interconnected via a transmission path, at least one of said multiple processors having an application program which utilizes a plurality of data four execution thereof, said at least one of said multiple processors comprising:

a storage for storing, for later use, information related to said plurality of data utilized for execution of said application program; and a processing unit for receiving, from said transmission path, data to be utilized by said application program based upon said information stored in said storage, determining whether at least one datum of said plurality of data utilized for execution of said application program has been received, said at least one datum being a predetermined datum for starting execution of said application program, and starting execution of said application program when said predetermined datum has been received regardless of whether or not all of said plurality of data utilized for execution of said application program has been received;

wherein said processing unit, when there is at least an unreceived datum of said plurality of data utilized for execution of said application program, starts execution of said application program using a previously and most recently updated value of said unreceived datum as said unreceived datum, and received data.

8. A multi-processing system according to claim 7, wherein said storage stores code data corresponding to contents of said plurality of data utilized for execution of said application program.

9. A multi-processing system according to claim 8, wherein each of said multiple processors sends processed result data to said transmission path with at least one of said code data corresponding to the content of said processed result data.

10. A multi-processing system according to claim 6, wherein said storage stores code data corresponding to contents of said plurality of data utilized for execution of said application program.

11. A multi-processing system according to claim 10, wherein each of said multiple processors sends processed result data to said transmission path with at least one of said code data corresponding to the content of said processed result data.

* * * * *